United States Patent
Lee et al.

(10) Patent No.: US 12,082,299 B2
(45) Date of Patent: Sep. 3, 2024

(54) USER EQUIPMENT ASSISTANCE INFORMATION INDICATING A REDUCTION TO ONE TRANSMIT CHAIN FOR A SUBSCRIPTION

(71) Applicant: QUALCOMM Incorporated, San Diego, CA (US)

(72) Inventors: Kuo-Chun Lee, San Diego, CA (US); Qingxin Chen, San Diego, CA (US); Arvind Vardarajan Santhanam, San Diego, CA (US); Reza Shahidi, San Diego, CA (US); Cheol Hee Park, San Diego, CA (US); Mona Agrawal, San Diego, CA (US); Karthik Venkatram, San Diego, CA (US); Subashini Krishnamurthy, San Diego, CA (US); Pranay Sudeep Rungta, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 410 days.

(21) Appl. No.: 17/648,522

(22) Filed: Jan. 20, 2022

(65) Prior Publication Data
US 2023/0232206 A1  Jul. 20, 2023

(51) Int. Cl.
| | |
|---|---|
| H04W 8/20 | (2009.01) |
| H04B 7/0413 | (2017.01) |
| H04W 24/08 | (2009.01) |
| H04W 72/044 | (2023.01) |
| H04W 72/23 | (2023.01) |

(52) U.S. Cl.
CPC ........... *H04W 8/20* (2013.01); *H04B 7/0413* (2013.01); *H04W 24/08* (2013.01); *H04W 72/044* (2013.01); *H04W 72/23* (2023.01)

(58) Field of Classification Search
CPC ..... H04L 5/0091; H04L 5/001; H04L 5/0023; H04L 5/0016; H04L 5/0048; H04W 72/23; H04W 24/08; H04W 72/044; H04W 8/20; H04W 76/20; H04W 72/21; H04B 7/0413
See application file for complete search history.

(56) References Cited

U.S. PATENT DOCUMENTS

| | | | |
|---|---|---|---|
| 2022/0417730 A1* | 12/2022 | Tsai | H04W 8/22 |
| 2023/0345416 A1* | 10/2023 | Chin | H04W 68/02 |

* cited by examiner

*Primary Examiner* — Maharishi V Khirodhar
*Assistant Examiner* — Kenneth P Hunt
(74) *Attorney, Agent, or Firm* — Harrity & Harrity, LLP

(57) ABSTRACT

Various aspects of the present disclosure generally relate to wireless communication. In some aspects, a user equipment (UE) may transmit, via a subscription of the UE to a network node, a UE assistance information (UAI) that indicates a reduction to one uplink multiple-input multiple-output (MIMO) layer for the subscription. The UE may transmit, via the subscription to the network node, an uplink transmission using one uplink MIMO layer on one transmit (Tx) chain of the UE based at least in part on the UAI and a timer associated with the UAI. Numerous other aspects are described.

30 Claims, 10 Drawing Sheets

USER EQUIPMENT ASSISTANCE INFORMATION INDICATING A REDUCTION TO ONE TRANSMIT CHAIN FOR A SUBSCRIPTION

FIELD OF THE DISCLOSURE

Aspects of the present disclosure generally relate to wireless communication and to techniques and apparatuses for user equipment (UE) assistance information indicating a reduction to one transmit chain for a subscription.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: transmit, via a subscription of the UE to a network node, a UE assistance information (UAI) that indicates a reduction to one uplink multiple-input multiple-output (MIMO) layer for the subscription; and transmit, via the subscription to the network node, an uplink transmission using one uplink MIMO layer on one transmit (Tx) chain of the UE based at least in part on the UAI and a timer associated with the UAI.

In some implementations, a method of wireless communication performed by a UE includes transmitting, via a subscription of the UE to a network node, a UAI that indicates a reduction to one uplink MIMO layer for the subscription; and transmitting, via the subscription to the network node, an uplink transmission using one uplink MIMO layer on one Tx chain of the UE based at least in part on the UAI and a timer associated with the UAI.

In some implementations, a non-transitory computer-readable medium storing a set of instructions for wireless communication includes one or more instructions that, when executed by one or more processors of a UE, cause the UE to: transmit, via a subscription of the UE to a network node, a UAI that indicates a reduction to one uplink MIMO layer for the subscription; and transmit, via the subscription to the network node, an uplink transmission using one uplink MIMO layer on one Tx chain of the UE based at least in part on the UAI and a timer associated with the UAI.

In some implementations, an apparatus for wireless communication includes means for transmitting, via a subscription of the apparatus to a network node, assistance information that indicates a reduction to one uplink MIMO layer for the subscription; and means for transmitting, via the subscription to the network node, an uplink transmission using one uplink MIMO layer on one Tx chain of the apparatus based at least in part on the assistance information and a timer associated with the assistance information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
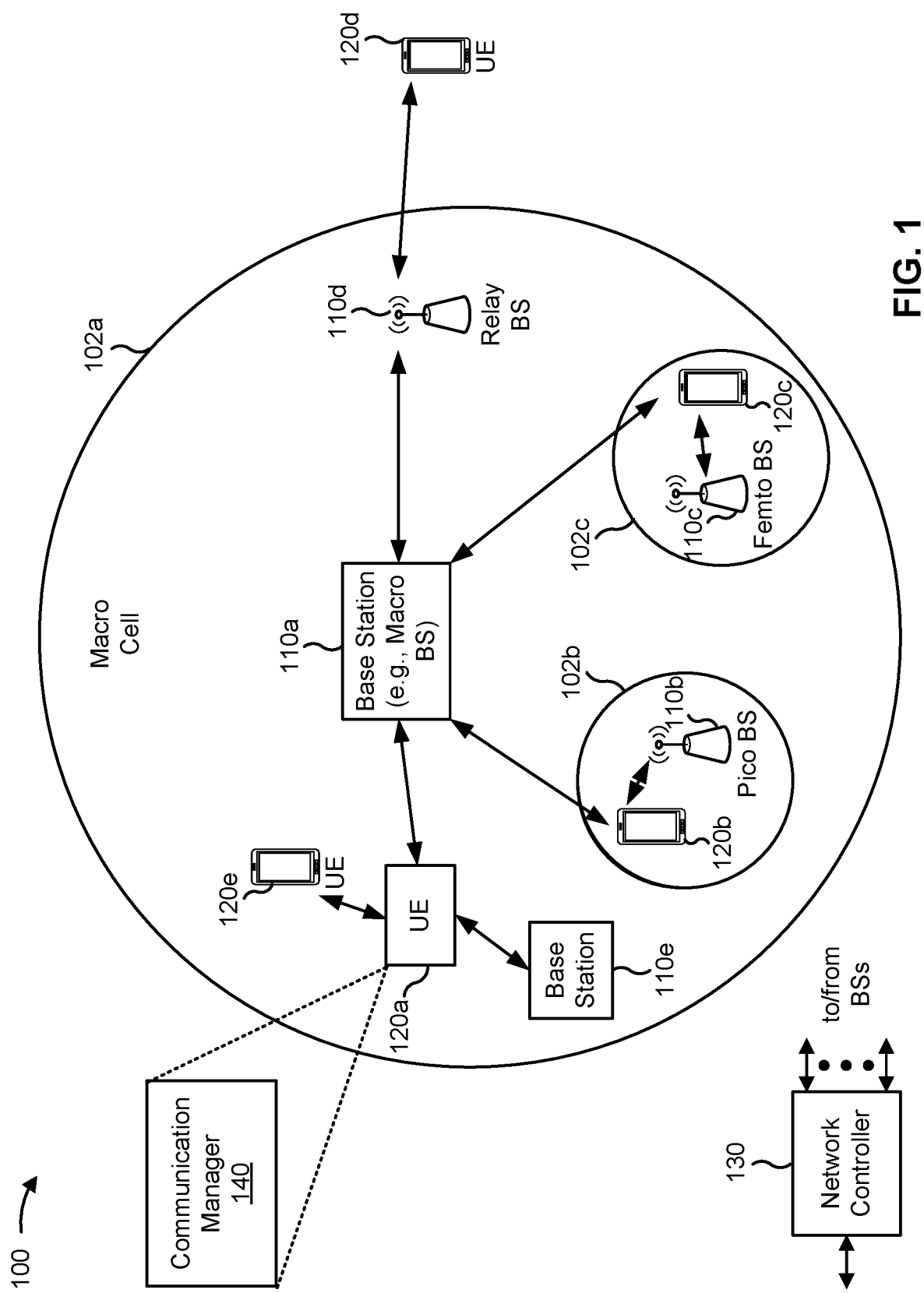
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may transmit, via a subscription of the UE to a network node, a UE assistance information (UAI) that indicates a reduction to one uplink multiple-input multiple-output (MIMO) layer for the subscription; and transmit, via the subscription to the network node, an uplink transmission using one uplink MIMO layer on one transmit (Tx) chain of the UE based at least in part on the UAI and a timer associated with the UAI. Additionally, or alternatively, the communication manager 140 may perform one or more other operations described herein.

As indicated above, FIG. 1 is provided as an example. Other examples may differ from what is described with regard to FIG. 1.

Figure 2:
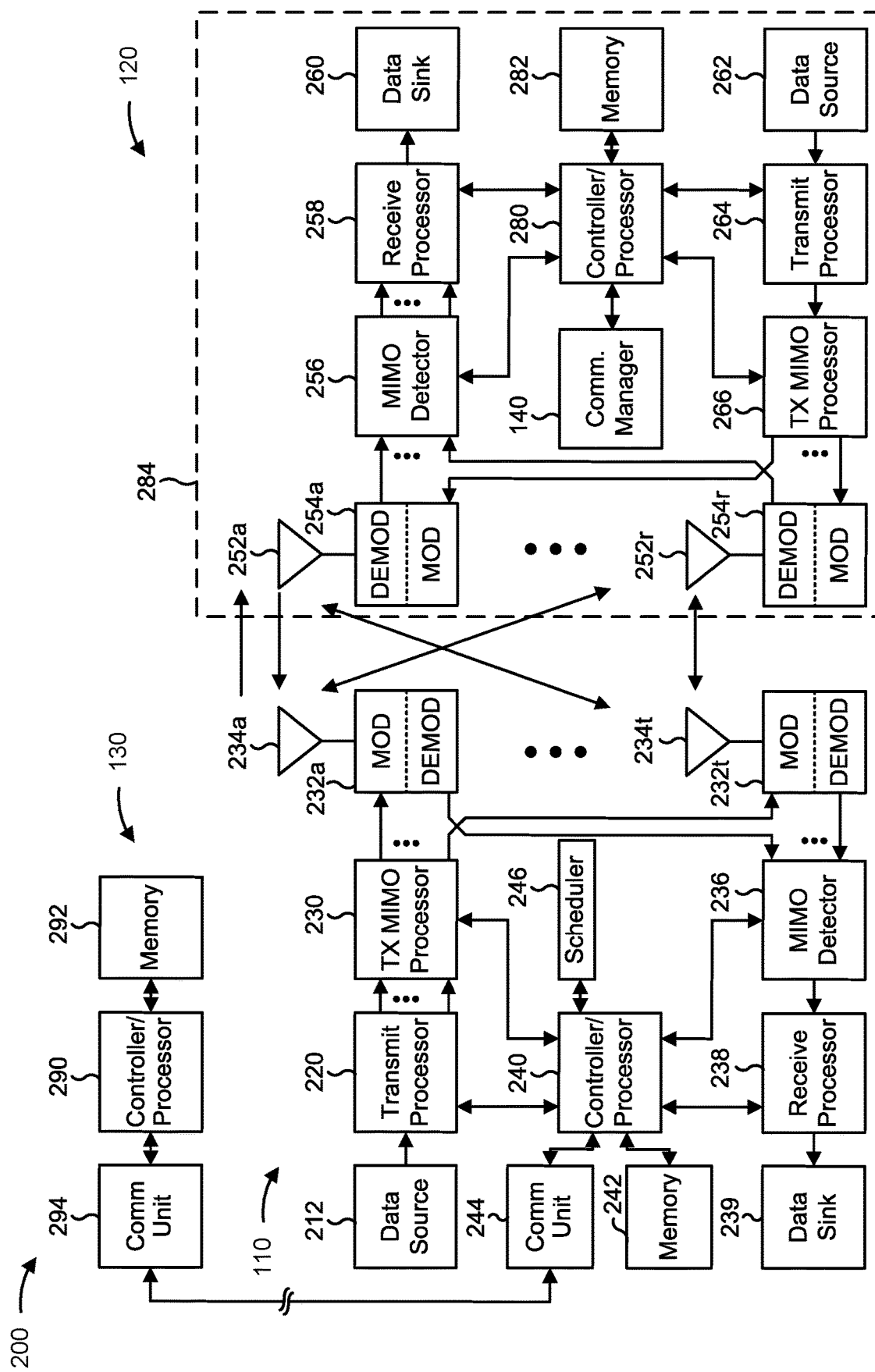
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) MIMO processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the base station 110, the controller/processor 280 of the UE 120, and/or any other component(s) of FIG. 2 may perform one or more techniques associated with a UAI indicating a reduction to one Tx chain for a subscription, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) includes means for transmitting, via a subscription of the UE to a network node, a UAI that indicates a reduction to one uplink MIMO layer for the subscription; and/or means for transmitting, via the subscription to the network node, an uplink transmission using one uplink MIMO layer on one Tx chain of the UE based at least in part on the UAI and a timer associated with the UAI. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A UE that supports a dual subscriber identification module (SIM) dual-active (DSDA) mode may include two SIM cards that have the capability to operate in two separate networks. The two SIM cards may be associated with two separate subscriptions. For example, each SIM card may store network-specific information used to authenticate and identify subscribers on a specific network. A first SIM card may be associated with a first subscription, and a second SIM card may be associated with a second subscription. The first subscription may be associated with a first RAT, such as NR. The second subscription may be associated with a second RAT, such as NR or LTE. The first subscription may be associated with a first network operator, and the second subscription may be associated with a second network operator. The UE may have one or more Tx chains that allow for dual uplink connections, such that the two separate subscriptions may support uplink at a same time. In other words, the UE may support "full concurrency," since the one or more Tx chains may concurrently support the two separate subscriptions at the same time.

The UE may include a first Tx chain associated with the first subscription. The first Tx chain may perform uplink transmissions to a first network node. The UE may include a second Tx chain associated with the second subscription. The second Tx chain may perform uplink transmissions to a second network node. Alternatively, the UE may include a single Tx chain associated with both the first subscription and the second subscription based on a time division scheme of the single Tx chain between the first subscription and the second subscription. The first network node may be associated with a first network, and the second network node may be associated with a second network. In some cases, the first network node and the second network node may be a same network node in a same network.

In some cases, the UE may include multiple SIM cards (e.g., two or more SIM cards) associated with multiple subscriptions (e.g., two or more subscriptions), respectively. In this case, the UE may include multiple Tx chains (e.g., two or more Tx chains) corresponding to the multiple SIM cards and the multiple subscriptions, respectively.

The UE may also support a dual SIM dual-standby (DSDS) mode. When the UE operates in the DSDS mode, the first Tx chain associated with the first subscription may be in a connected state, and the second Tx chain associated with the second subscription may be in an idle state. The first subscription may simultaneously use the first Tx chain and the second Tx chain for uplink MIMO. In other words, the first subscription may use two Tx chains for uplink MIMO when the first subscription is associated with the connected state and when the second subscription is associated with the idle state. When the second subscription is associated with the idle state, the second subscription may use neither the first Tx chain nor the second Tx chain.

The UE may exit the DSDS mode and enter the DSDA mode. When the UE exits the DSDS mode and enters the DSDA mode, the first subscription and the second subscription may each only use a single Tx chain, and an uplink MIMO associated with the DSDS mode may fall back to an uplink single-input single-output (SISO). In other words, during the DSDS mode, the first subscription may use both Tx chains, but after exiting the DSDS mode and entering the DSDA mode, the first subscription may only use the first Tx chain, and the second Tx chain may be used by the second subscription. The first subscription may move from using two Tx chains to one Tx chains when transitioning between the DSDS mode and the DSDA mode.

As an example, the UE may enter an NR and NR DSDA, in which the first subscription and the second subscription may both be associated with NR. The first subscription and the second subscription may each only use one Tx chain, and an uplink MIMO may fall back to an uplink SISO.

As another example, the UE may enter an NR and LTE DSDA, in which the first subscription may be associated with NR and the second subscription may be associated with LTE. The first subscription may only use one Tx chain, and an uplink MIMO may fall back to an uplink SISO. The second subscription may continue to use only one Tx chain, since LTE is associated with (e.g., always associated with) one Tx chain. In other words, uplink MIMO involving simultaneous use of two Tx chains may not be supported for the second subscription associated with LTE.

When a UE transitions between the DSDS mode and the DSDA mode, the UE may reduce a quantity of Tx chains for a subscription (e.g., a subscription associated with NR) from two Tx chains to one Tx chain, but a network may not be notified of the reduction until a period of time has passed. During this period of time, a relatively high block error rate (BLER) may occur since the network may operate under an assumption that the UE still supports uplink MIMO layers, and the network may accordingly allocate an uplink grant with MIMO layers.

In various aspects of techniques and apparatuses described herein, a UE may transmit, via a subscription of the UE to a network node, a UAI that indicates a reduction to one uplink MIMO layer for the subscription. The UE may transmit the UAI based at least in part on the UE entering a mode (e.g., a DSDA mode) that supports one Tx chain for the subscription. The UE may exit a mode (e.g., a DSDS mode) that allows two Tx chains to be used for the subscription. The UE may start a timer based at least in part on the UAI transmitted to the network node. The UE may force the subscription to use the one Tx chain, for example, after an expiry of the timer. The UE may transmit, via the subscription to the network node, an uplink transmission using one uplink MIMO layer on the one Tx chain of the UE based at least in part on the UAI and the timer. The timer may allow the UE to delay moving to the one Tx chain, which may prevent a relatively high BLER for the UE due to the network node operating under an assumption that the subscription is still using the two Tx chains. With the timer, the UE may not switch to the one Tx chain when an uplink grant allocation with MIMO layers is still valid, which may cause the UE to not experience the relatively high BLER.

Figure 3:
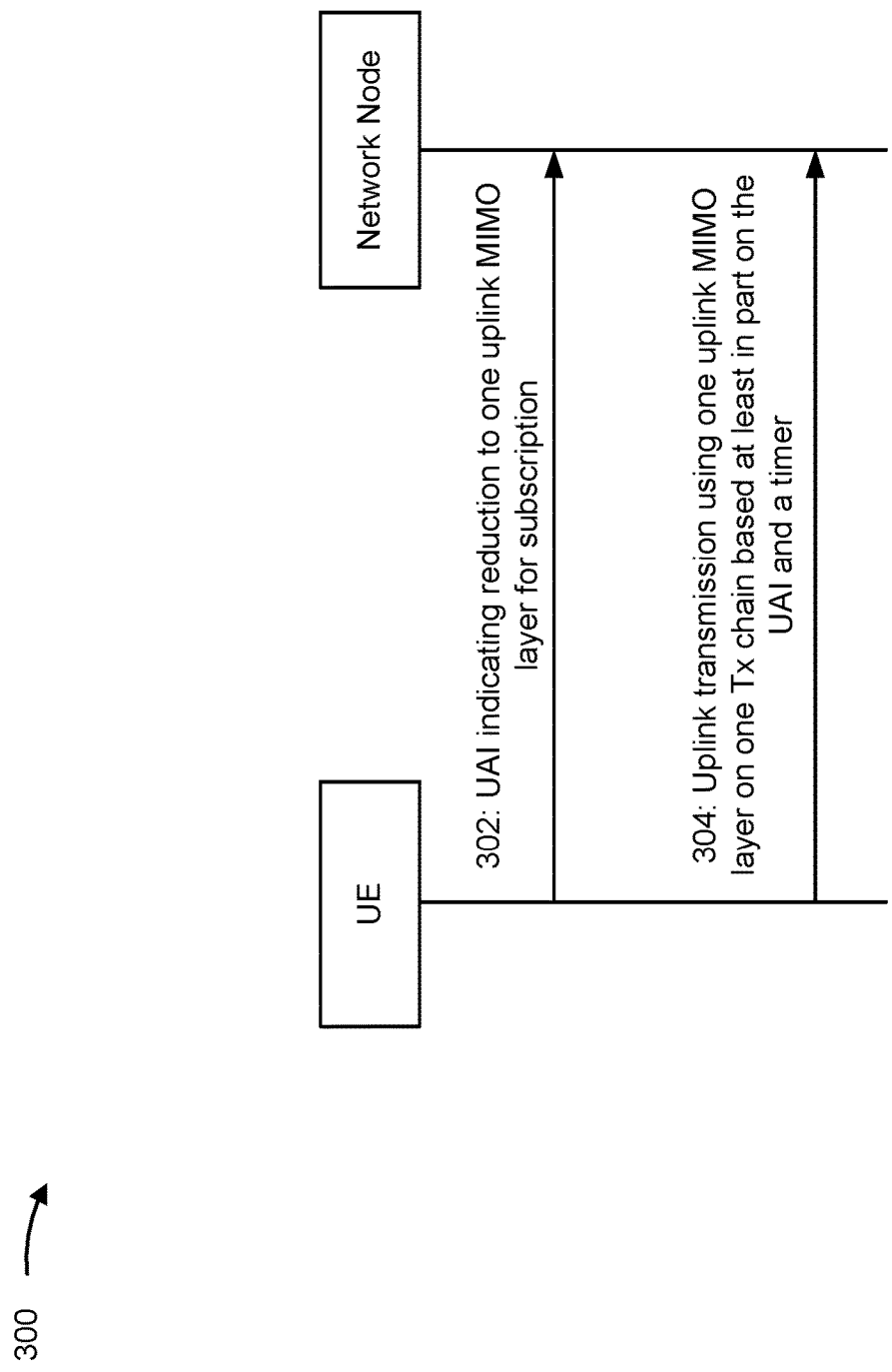
FIGS. 3-8 are diagrams illustrating examples associated with UE assistance information (UAI) indicating a reduction to one transmit (Tx) chain for a subscription, in accordance with the present disclosure.

FIG. 3 is a diagram illustrating an example 300 associated with a UAI indicating a reduction to one Tx chain for a subscription, in accordance with the present disclosure. As shown in FIG. 3, example 300 includes communication between a UE (e.g., UE 120) and a network node (e.g., base station 110). In some aspects, the UE and the network node may be included in a wireless network, such as wireless network 100.

As shown by reference number 302, the UE may transmit, via a subscription of the UE to a network node, a UAI that indicates a reduction to one uplink MIMO layer for the subscription. The UE may transmit the UAI based at least in part on the UE entering a mode (e.g., DSDA mode) that supports the one Tx chain for the subscription. The UE may start a timer based at least in part on the UAI that indicates the reduction to one uplink MIMO layer for the subscription. In some aspects, the UE may force the one Tx chain for the subscription after an expiry of the timer. In other words, the subscription may start using the one Tx chain after the expiry of the timer.

In some aspects, the subscription may be associated with NR. The UE may support multiple subscriptions and multiple Tx chains corresponding to the multiple subscriptions. The UE may support two or more subscriptions and two or more Tx chains corresponding to the two subscriptions.

In some aspects, the UE may receive, from the network node and after the expiry of the timer, a radio resource control (RRC) reconfiguration that reconfigures a maximum quantity of uplink MIMO layers to one or includes an indication for the subscription to switch to a bandwidth part (BWP) with a maximum quantity of uplink MIMOs of one, or downlink control information (DCI) that causes the subscription to switch to the BWP with the maximum quantity of uplink MIMOs of one.

In some aspects, the UE may start the timer based at least in part on the UAI that indicates the reduction to one uplink MIMO layer for the subscription. The UE may receive, from the network node and before the expiry of the timer, an RRC reconfiguration that reconfigures a maximum quantity of uplink MIMO layers to one or includes an indication for the subscription to switch to a BWP with a maximum quantity of uplink MIMOs of one, or DCI that causes the switch to the BWP with the maximum quantity of uplink MIMOs of one. The UE may force the one Tx chain for the subscription before the expiry of the timer based at least in part on the RRC reconfiguration or the DCI.

In some aspects, the UE may transmit, via the subscription to the network node, an uplink transmission using two Tx chains of the UE prior to the expiry of the timer and based at least in part on an uplink grant received from the network node having two MIMO layers. In other words, before the UE forces the subscription to use the one Tx chain and when the timer is still running, the UE may continue to use the two Tx chains for the subscription.

In some aspects, the UE may force the use of one Tx chain for the subscription. The UE may receive the RRC configuration or the DCI from the network node. The UE may suppress a radio link failure (RLF) monitoring for an uplink during a time period between forcing the use of one Tx chain for the subscription and receiving the RRC reconfiguration or the DCI. The UE, to suppress the RLF monitoring, may suspend an incrementing of a counter associated with a quantity of retransmissions to avoid reaching a value associated with a maximum quantity of retransmissions. The UE may resume the RLF monitoring after receiving the RRC reconfiguration or the DCI from the network node. The UE may continue performing RLF monitoring for a downlink.

As shown by reference number 304, the UE may transmit, via the subscription to the network node, an uplink transmission using one uplink MIMO layer on one Tx chain of the UE based at least in part on the UAI and the timer associated with the UAI. The UE may perform, via the subscription, the uplink transmission using the one Tx chain when the UE operates in the mode (e.g., the DSDA mode) that supports the one Tx chain for the subscription. In some aspects, the UE may perform the uplink transmission by transmitting on a single physical uplink shared channel (PUSCH) port irrespective of an uplink grant received from the network node having two MIMO layers. In some aspects, the UE may perform the uplink transmission by transmitting a sounding reference signal (SRS) on a single SRS port to trigger an allocation of an uplink grant with a single layer.

In some aspects, the UE may determine to enter a mode (e.g., a DSDS mode) that supports two Tx chains for the subscription. The UE may start a hysteresis timer based at least in part on the determination to enter the mode that supports the two Tx chains for the subscription. The hysteresis timer may prevent the subscription from transmitting another UAI while the hysteresis timer is running. The UE may determine whether to transmit another UAI after an expiry of the hysteresis timer based at least in part on the UAI (e.g., whether the UAI that was previously transmitted indicated a quantity of uplink layers that is still valid). The UE may configure a duration of the hysteresis timer based at least in part on a duration of a prohibit timer that prohibits consecutive UAI transmissions within a defined time period.

As indicated above, FIG. 3 is provided as an example. Other examples may differ from what is described with regard to FIG. 3.

Figure 4:
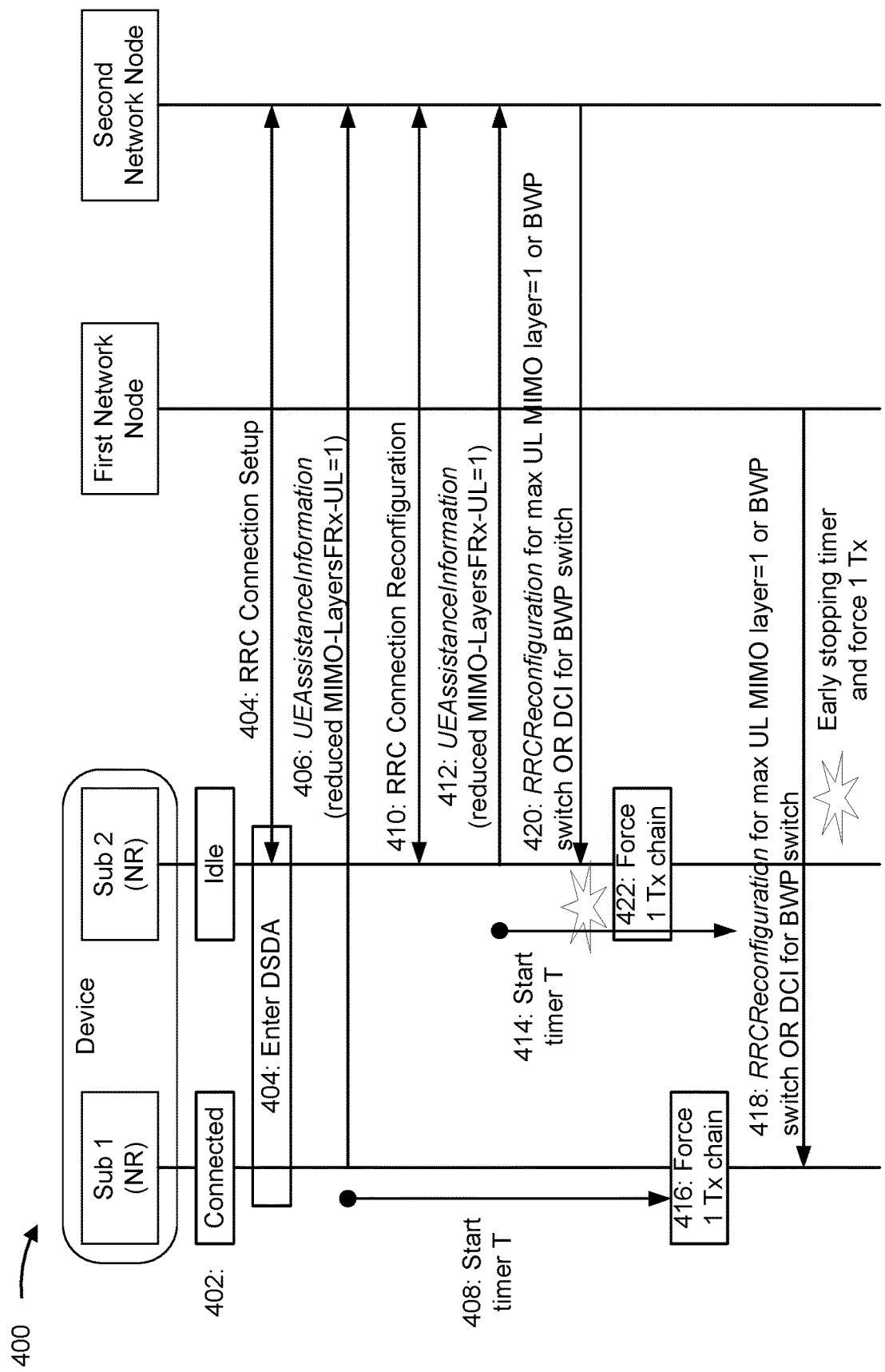

FIG. 4 is a diagram illustrating an example 400 associated with a UAI indicating a reduction to one Tx chain for a subscription, in accordance with the present disclosure. As shown in FIG. 4, example 400 includes communication between a UE (e.g., UE 120), a first network node (e.g., base station 110a), and a second network (e.g., base station 110e). In some aspects, the UE, the first network node, and the second network node may be included in a wireless network, such as wireless network 100.

In some aspects, the UE may be associated with a first subscription and a second subscription. The first subscription of the UE and the second subscription of the UE may each be associated with NR. Further, the UE may include a first Tx chain and a second Tx chain.

As shown by reference number 402, the first subscription (Sub 1) may be associated with a connected state, and the second subscription (Sub 2) may be associated with an idle state. The UE may operate in a DSDS mode, during which the first subscription may be associated with the connected state and the second subscription may be associated with the idle state. When the UE operates in the DSDS mode, the first subscription may use both the first Tx chain and the second Tx chain of the UE. In other words, the first subscription may use both the first Tx chain and the second Tx chain for uplink MIMO when the second subscription is associated with the idle state.

As shown by reference number 404, the UE may exit the DSDS mode and enter a DSDA mode. When entering the DSDA mode, the first subscription may remain in the connected mode, and the second subscription may move from the idle mode to a connected mode. The second subscription may perform an RRC connection setup with the second network node, such that the second subscription may enter the connected mode. At this point, the first subscription may still be associated with both Tx chains of the UE.

As shown by reference number 406, the first subscription may transmit a first UAI to the first network node. The first UAI may indicate a parameter of reducedMMO-LayersFRx-UL 1, which may indicate a reduced MIMO layers frequency range for uplink that is equal to one. The first UAI may indicate that one Tx chain (e.g., only the first Tx chain) is to be used by the first subscription. In other words, the first UAI may indicate a request for uplink SISO, which may provide an explicit notification to the first network node of the first subscription forcing to use one Tx chain. Further, "FRx" may refer to FR1 or FR2 depending on a current connected frequency range.

In some aspects, a first subscription performing a transmission or a reception, as described herein, may refer to the UE performing a transmission or a reception via the first subscription. Similarly, a second subscription performing a transmission or a reception, as described herein, may refer to the UE performing a transmission or a reception via the second subscription. Further, actions performed by the first subscription or the second subscription may refer to the UE performing such actions for the first subscription or the second subscription.

As shown by reference number 408, the first subscription may start a timer T (e.g., when the first UAI is ready to be transmitted). For example, the first subscription may start the timer and transmit the first UAI at approximately a same time (within a defined time threshold). A duration of the timer may be based at least in part on a period of time needed for the first network node to process the first UAI and/or for allocated uplink grants with MIMO layers to no longer be useable by the first subscription.

As shown by reference number 410, the second subscription may perform an RRC connection reconfiguration with the second network node.

As shown by reference number 412, second first subscription may transmit a second UAI to the second network node. The second UAI may indicate a parameter of reduced-MIMO-LayersFRx-UL 1, which may indicate a reduced MIMO layers frequency range for uplink that is equal to one. The second UAI may indicate that one Tx chain (e.g., only the second Tx chain) is to be used by the second subscription. In other words, the second UAI may indicate a request for uplink SISO.

As shown by reference number 414, the second subscription may start the timer T (e.g., when the second UAI is ready to be transmitted). For example, the second subscription may start the timer and transmit the second UAI at approximately a same time (within a defined time threshold). A duration of the timer may be based at least in part on a period of time needed for the second network node to process the second UAI and/or for allocated uplink grants with MIMO layers to no longer be useable by the second subscription.

As shown by reference number 416, after the timer associated with the first subscription expires, the first subscription may use one Tx chain (e.g., the first Tx chain). In other words, after the timer associated with the first subscription expires, the first subscription may force to use one Tx chain. In other words, the first subscription may switch to using only the one Tx chain. A delayed one Tx chain fallback may be based at least in part on the timer. After the timer expires and the UE forces to use one Tx chain, the UE may transmit on one PUSCH port even when an uplink grant has two uplink layers. Further, the UE may sound only on one SRS port, which may trigger the first network node to only allocate an uplink grant with a single layer. In some aspects, the timer may allow the first subscription to transmit the first UAI without being forced to use one Tx chain when an uplink grant of two layers is received from the first network node, which may result in a relatively high BLER for the UE.

As shown by reference number 418, the first subscription may receive, from the first network node, an RRC reconfiguration that reconfigures a maximum quantity of uplink MIMO layers equal to one. The RRC reconfiguration may indicate a PUSCH serving cell configuration, which may indicate the maximum quantity of uplink MIMO layers equal to one (e.g., max UL MIMO layers=1). In some aspects, the RRC reconfiguration may include an indication to switch to a BWP in which a maximum quantity of uplink MIMO layers is equal to one. In some aspects, the first subscription may receive, from the first network node, DCI that includes an indication to switch to a BWP in which a maximum quantity of uplink MIMO layers is equal to one. The first network node may acknowledge the one Tx chain used by the first subscription based at least in part on the RRC reconfiguration or the DCI.

As shown by reference number 420, when the timer started by the second subscription is still running, the second subscription may receive, from the second network node, an RRC reconfiguration that reconfigures a maximum quantity of uplink MIMO layers equal to one, an RRC reconfiguration that includes an indication to switch to a BWP in which a maximum quantity of uplink MIMO layers is equal to one, or DCI that includes an indication to switch to a BWP in which a maximum quantity of uplink MIMO layers is equal to one. In this case, as shown by reference number 422, after receiving the RRC reconfiguration or the DCI, the second subscription may use one Tx chain (e.g., the second Tx chain). In other words, the second subscription may force to use one Tx chain, even though the timer has not yet expired. As a result, when operating in the DSDA mode, the first subscription may use one Tx chain (e.g., the first Tx chain), and the second subscription may use another Tx chain (e.g., the second Tx chain).

In some aspects, starting the timer at the first subscription may cause the first subscription to delay using one Tx chain. The first network node may acknowledge the one Tx chain within a relatively short period of a timer expiry, which may reduce a BLER associated with the first subscription. Further, starting the timer at the second subscription may cause the second subscription to delay using one Tx chain. The second network node may acknowledge the one Tx chain before a timer expiry, which may reduce a BLER associated with the second subscription. The timer may allow the first network node and the second network node to become aware of the first subscription and the second subscription moving to one Tx chain.

In some aspects, when the timer is running, the first subscription associated with NR and/or the second subscription associated with NR may still use two Tx chains for a relatively short period of time (e.g., two Tx chains shared by two NR subscriptions) in order to transmit a UAI successfully when a network allocates an uplink grant with MIMO layers.

As indicated above, FIG. 4 is provided as an example. Other examples may differ from what is described with regard to FIG. 4.

Figure 5:
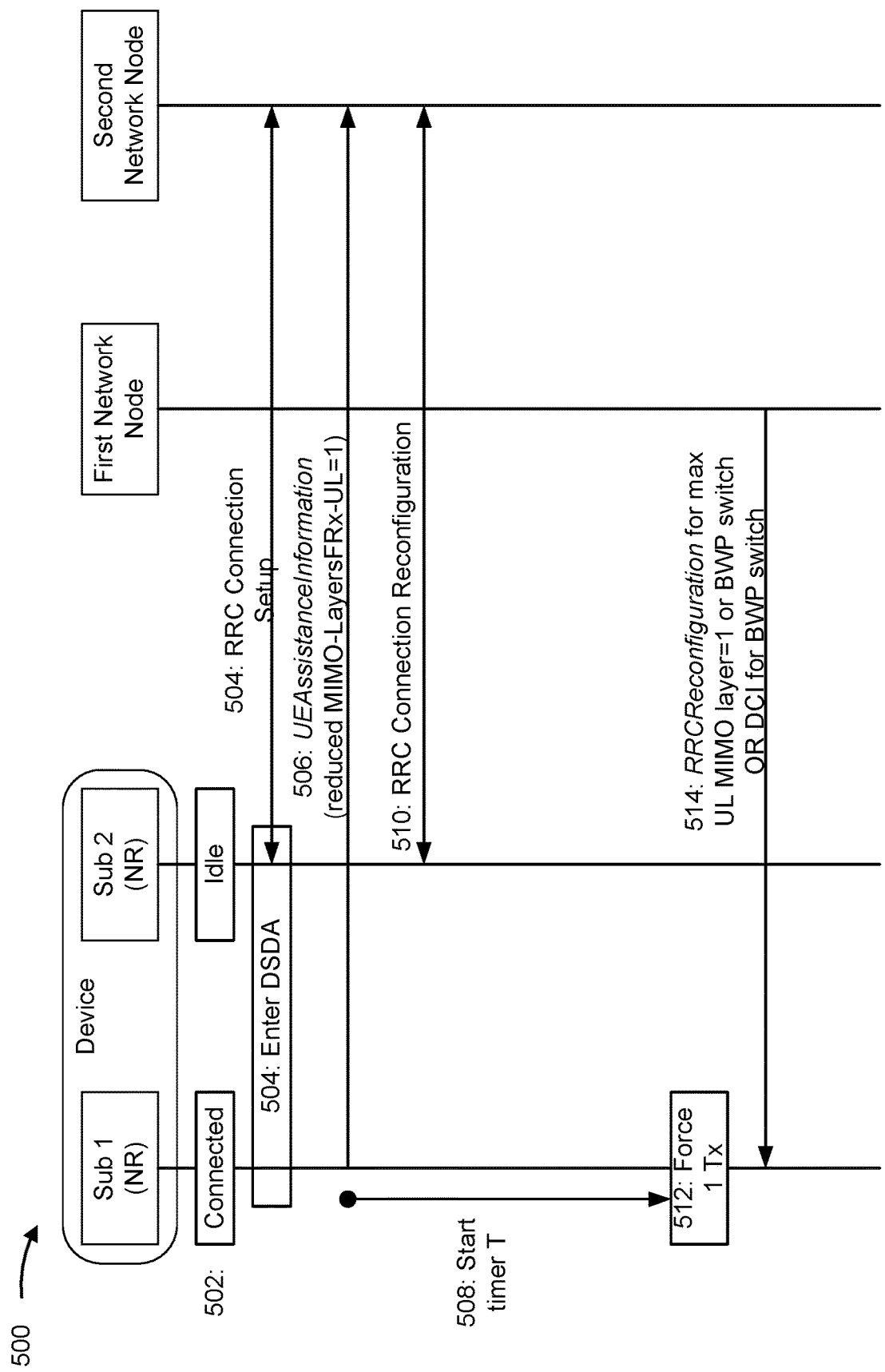

FIG. 5 is a diagram illustrating an example 500 associated with a UAI indicating a reduction to one Tx chain for a subscription, in accordance with the present disclosure. As shown in FIG. 5, example 500 includes communication between a UE (e.g., UE 120), a first network node (e.g., base station 110*a*), and a second network (e.g., base station 110*e*). In some aspects, the UE, the first network node, and the second network node may be included in a wireless network, such as wireless network 100.

In some aspects, the UE may be associated with a first subscription and a second subscription. The first subscription of the UE may be associated with NR, and the second subscription of the UE may be associated with LTE. Further, the UE may include a first Tx chain and a second Tx chain.

As shown by reference number 502, the first subscription may be associated with a connected state and the second subscription may be associated with an idle state. The UE may operate in a DSDS mode, during which the first subscription may be associated with the connected state and the second subscription may be associated with the idle state. When the UE operates in the DSDS mode, the first subscription may use both the first Tx chain and the second Tx chain of the UE.

As shown by reference number 504, the UE may exit the DSDS mode and enter a DSDA mode. When entering the DSDA mode, the first subscription may remain in the connected mode, and the second subscription may move from the idle mode to a connected mode. The second subscription may perform an RRC connection setup with the second network node, such that the second subscription may enter the connected mode.

As shown by reference number 506, the first subscription may transmit a UAI to the first network node. The UAI may indicate a parameter of reducedMMO-LayersFRx-UL=1, which may indicate a reduced MIMO layers frequency range for uplink that is equal to one.

As shown by reference number 508, the first subscription may start a timer T (e.g., when the UAI is ready to be transmitted). For example, the first subscription may start the timer and transmit the first at approximately a same time (within a defined time threshold). A duration of the timer may be based at least in part on a period of time needed for the first network node to process the UAI and/or for allocated uplink grants with MIMO layers to no longer be useable by the first subscription.

As shown by reference number 510, the second subscription may perform an RRC connection reconfiguration with the second network node.

As shown by reference number 512, after the timer associated with the first subscription expires, the first subscription may use one Tx chain (e.g., the first Tx chain). In other words, after the timer associated with the first subscription expires, the first subscription may force to use one Tx chain.

As shown by reference number 514, the first subscription may receive, from the first network node, an RRC reconfiguration that reconfigures a maximum quantity of uplink MIMO layers equal to one. The RRC reconfiguration may indicate a PUSCH serving cell configuration, which may indicate the maximum quantity of uplink MIMO layers equal to one (e.g., max UL MIMO layers=1). In some aspects, the RRC reconfiguration may include an indication to switch to a BWP in which a maximum quantity of uplink MIMO layers is equal to one. In some aspects, the first subscription may receive, from the first network node, DCI that includes an indication to switch to a BWP in which a maximum quantity of uplink MIMO layers is equal to one. The first network node may acknowledge the one Tx chain used by the first subscription based at least in part on the RRC reconfiguration or the DCI.

In some aspects, since the second subscription is associated with LTE, the second subscription may not transmit a UAI to the second network node, and the second subscription may not receive an RRC reconfiguration or a DCI from the second network node. Since LTE is always associated with only one Tx chain, the second subscription is not required to transmit the UAI to the second network node and receive the RRC reconfiguration or the DCI from the second network node.

As indicated above, FIG. 5 is provided as an example. Other examples may differ from what is described with regard to FIG. 5.

In some aspects, a first subscription of a UE (e.g., as shown in FIGS. 4-5) may switch to one Tx chain (or force to use only one Tx chain), and then after a period of time, the first subscription may receive an RRC reconfiguration or DCI from a first network node. In other words, the period of time may correspond to a delay between switching to one Tx chain and receiving the RRC reconfiguration or DCI. In some aspects, during this period of time, the UE may suspend (or suppress) an RLF monitoring related to an uplink. The UE may suspend the RLF monitoring because, during this period of time, the first subscription may only use one Tx chain, but the first network node may assume that the first subscription is still using two Tx chains, which may mistakenly trigger an RLF event. As a result, during this period of time, the UE may suspend RLF monitoring for the uplink, which may cause the UE to suspend incrementing a quantity of radio link control (RLC) retransmissions (e.g., rlc-NumRetx) to avoid reaching a maximum quantity of RLC retransmissions (e.g., rlc-MaxNumRetx) which may relate to an uplink BLER. The UE may continue to perform RLF monitoring for a downlink, where the RLF monitoring for the downlink may be based at least in part on a timer T310 expiry.

Figure 6:
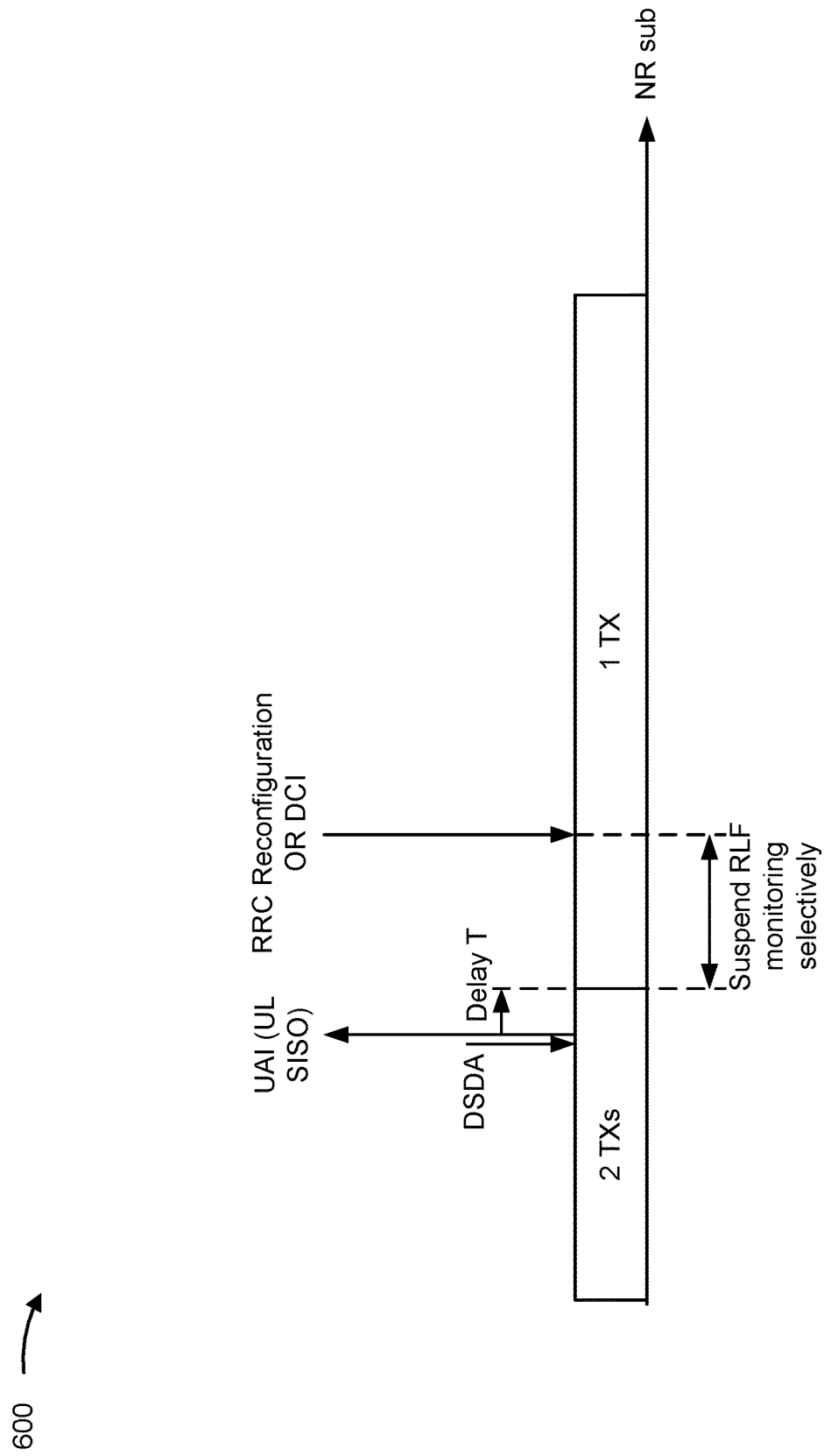

FIG. 6 is a diagram illustrating an example 600 associated with a UAI indicating a reduction to one Tx chain for a subscription, in accordance with the present disclosure.

As shown in FIG. 6, a subscription of a UE associated with NR may operate using two Tx chains when the UE operates in a DSDS mode. When operating in the DSDS mode, the UE may determine to enter a DSDA mode. The subscription may transmit a UAI to a network node, which may indicate an uplink SISO request. The uplink SISO request may be associated with the subscription changing from using two Tx chains to using one Tx chain. The subscription may transmit the UAI and after a delay, the subscription may start using one Tx chain. However, at this point, the subscription may not yet receive an RRC reconfiguration or DCI from the network node. As a result, after the subscription starts using one Tx chain, the subscription may suspend an RLF monitoring until the RRC reconfiguration or DCI is received from the network node. When suspending the RLF monitoring, the subscription may suspend incrementing a quantity of RLC retransmissions to avoid reaching a maximum quantity of RLC retransmissions (e.g., rlc-MaxNumRetx), which may relate to an uplink BLER. After the subscription receives the RRC reconfiguration or DCI from the network node and when the subscription continues to operate using one Tx chain, the subscription may resume the RLF monitoring.

As indicated above, FIG. 6 is provided as an example. Other examples may differ from what is described with regard to FIG. 6.

Figure 7:
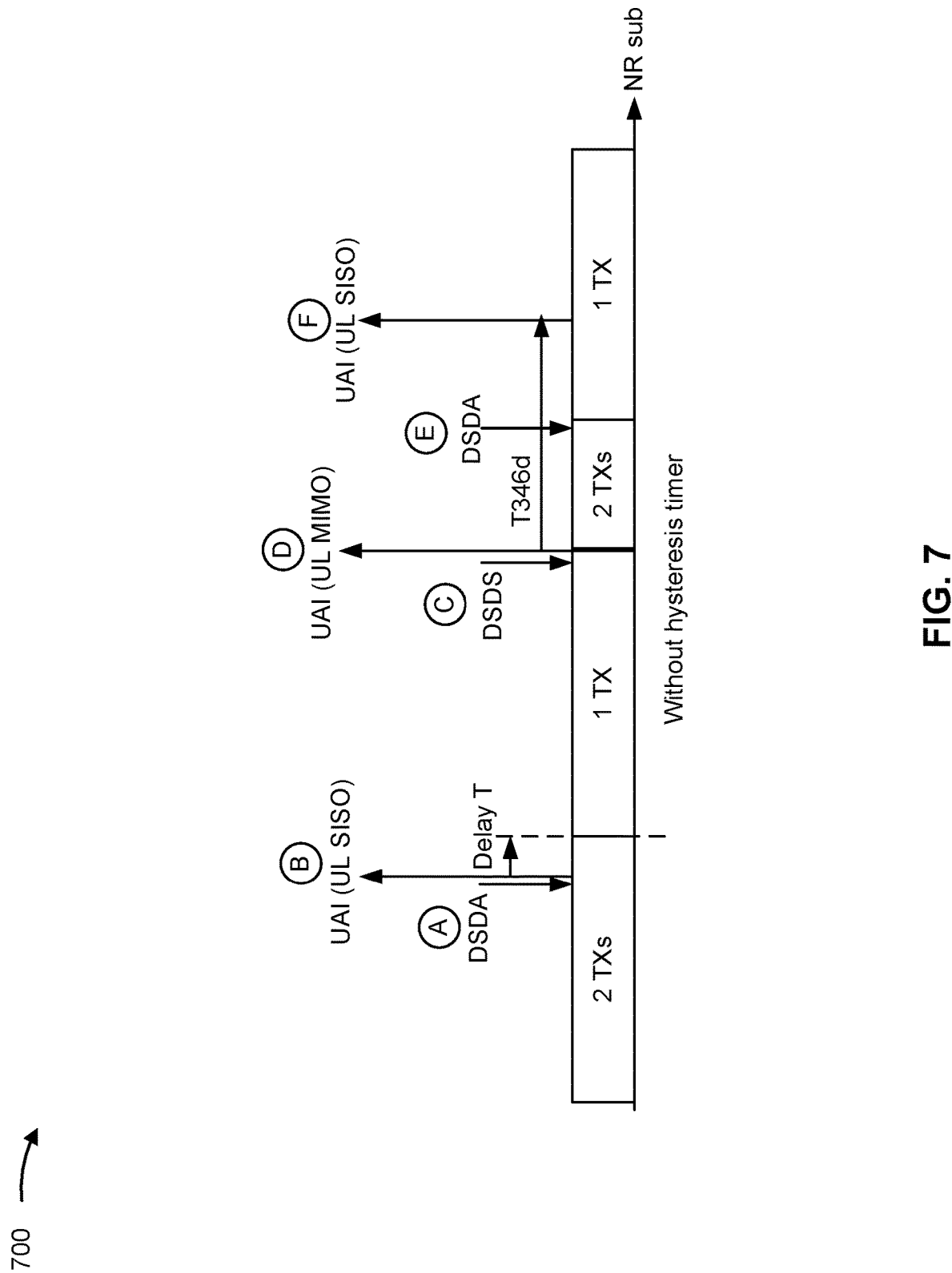

FIG. 7 is a diagram illustrating an example 700 associated with a UAI indicating a reduction to one Tx chain for a subscription, in accordance with the present disclosure.

In some aspects, a network node may configure a prohibit timer (e.g., a T346d or T345 timer) at a UE, which may prevent the UE from transmitting consecutive UAI to the network node within a relatively short period of time.

In some aspects, the UE may exit a DSDA mode and enter a DSDS mode, and then return back to the DSDA mode within a relatively short period of time. For example, the UE may spend one second in the DSDS mode before returning back to the DSDA mode.

As shown in FIG. 7, a subscription associated with NR of the UE may operate using two Tx chains when the UE operates in a DSDS mode. When operating in the DSDS mode, the UE may determine to enter a DSDA mode (event A). The subscription may transmit a UAI to a network node (event B), which may indicate an uplink SISO request. The uplink SISO request may be associated with the subscription changing from using two Tx chains to using one Tx chain. The subscription may transmit the UAI and after a delay, the subscription may start using one Tx chain.

In some aspects, the subscription may determine to return back to the DSDS mode (event C), and the subscription may transmit a UAI to a network node (event D), which may indicate an uplink SISO request. After transmitting the UAI, the UE may start the prohibit timer (e.g., T346d or T345), which may prevent the UE from transmitting another UAI when the prohibit timer is still running. After returning back to the DSDS mode (e.g., after event D occurs), the subscription may operate using two Tx chains.

In some aspects, the subscription may determine to return back to the DSDA mode (event E), and the subscription may operate using one Tx chain a relatively short period after determining to return back to the DSDA mode. However, the subscription may be prevented from transmitting a UAI with an uplink SISO request (event F) until an expiry of the prohibit timer. As a result, during a time period corresponding with the subscription determining to return back to the DSDA mode and the subscription transmitting the UAI with the uplink SISO request (e.g., a time period between event E and event F), the UE may experience a relatively high BLER because the subscription may switch to using one Tx chain but the network node does not become notified of the switch and operates under an assumption that the subscription is using two Tx chains.

In some aspects, the UE may be unable to send the UAI (event E) due to the prohibit timer, and although the subscription still forces to use one Tx chain, the relatively high BLER may occur because the network node is under the assumption that the subscription is able to support uplink MIMO layers. When the UE enters the DSDA mode again (event E), the prohibit timer does not allow the subscription to transmit the UAI to reduce to uplink MIMO layers until the prohibit timer expires (event F).

As indicated above, FIG. 7 is provided as an example. Other examples may differ from what is described with regard to FIG. 7.

Figure 8:
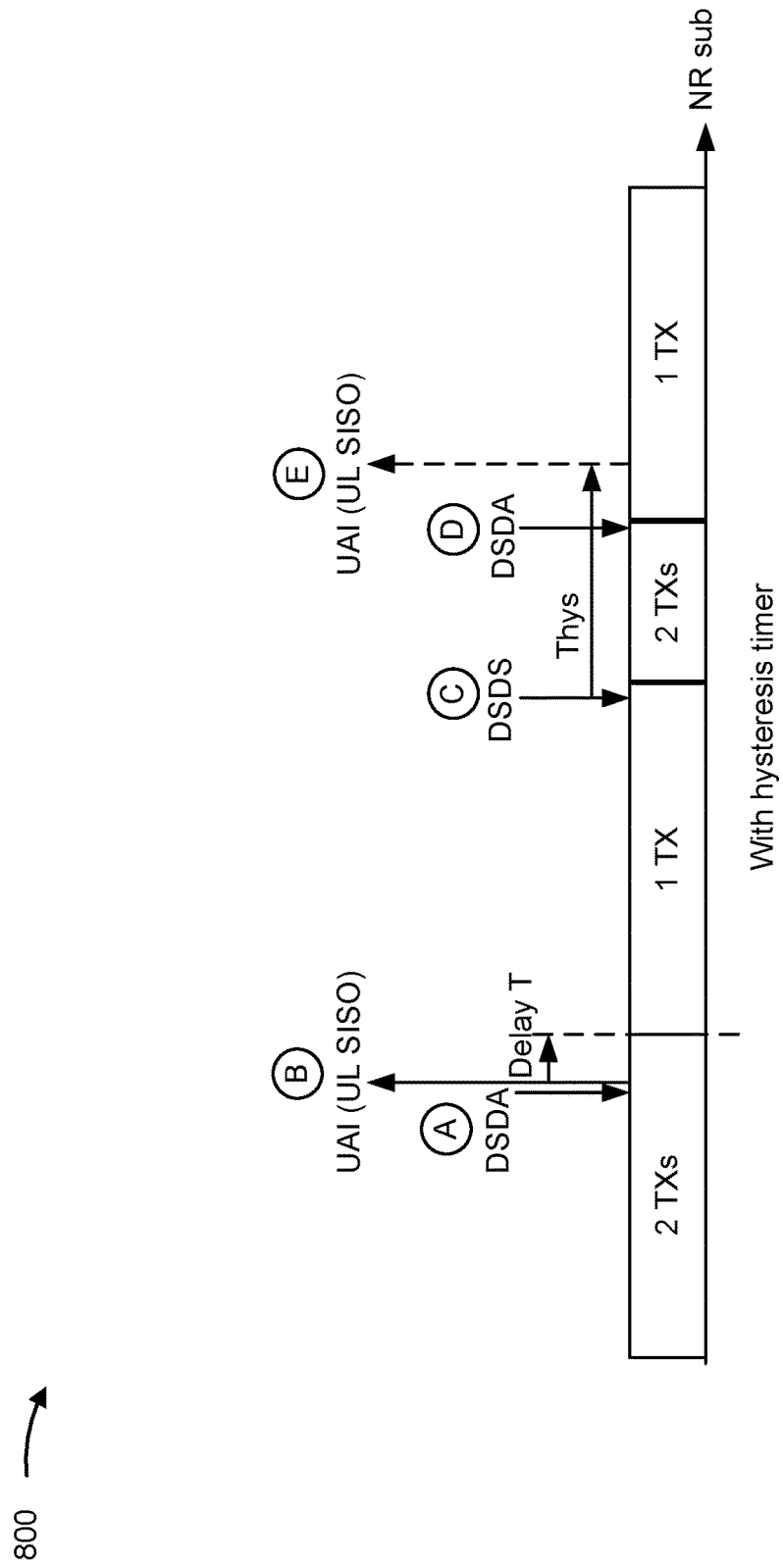

FIG. 8 is a diagram illustrating an example 800 associated with a UAI indicating a reduction to one Tx chain for a subscription, in accordance with the present disclosure.

As shown in FIG. 8, a subscription associated with NR of the UE may operate using two Tx chains when the UE operates in a DSDS mode. When operating in the DSDS mode, the UE may determine to enter a DSDA mode (event A). The subscription may transmit a UAI to a network node (event B), which may indicate an uplink SISO request. The uplink SISO request may be associated with the subscription changing from using two Tx chains to using one Tx chain. The subscription may transmit the UAI and after a delay, the subscription may start using one Tx chain.

In some aspects, the subscription may determine to return back to the DSDS mode (event C), and the subscription may operate using two Tx chains. After determining to return back to the DSDS mode (event C), the UE may start a hysteresis timer ($T_{hys}$), which may delay the subscription from transmitting a UAI to recover for two Tx chains to avoid a ping pong. The ping pong may occur when the UE exits the DSDA mode and enters the DSDS mode, and then shortly thereafter returns back to the DSDA mode. In other words, due to the hysteresis timer, the subscription may not transmit a UAI with an uplink MIMO request immediately after determining to return back to the DSDS mode, but the subscription may recover (e.g., immediately recover) to use the two Tx chains. With the hysteresis timer, the UE may avoid ping pong between the DSDA mode and the DSDS mode, which would otherwise cause a relatively high BLER due to a prohibit timer preventing a UAI transmission to reduce to an uplink SISO.

In some aspects, the subscription may determine to return back to the DSDA mode (event D) before expiry of the hysteresis timer. In other words, the subscription may only be in the DSDS mode for a relatively short period of time before determining to return back to the DSDA mode. The subscription may enter the DSDA mode and operate using one Tx chain. After an expiry of the hysteresis timer, the subscription may transmit a UAI to the network node (event E). In this case, since the subscription is already using one Tx chain and is no longer using two Tx chains, the subscription may transmit the UAI which indicates an uplink SISO request.

In some aspects, when the hysteresis timer is running and the UE returns back to the DSDA mode (event D), the network node may still operate under an assumption that the subscription is using one Tx chain, which may not result in a higher BLER. The subscription may change from two Tx chains to one Tx chain locally. At the expiry of the hysteresis timer, the subscription may reevaluate whether to transmit a UAI to the network node. The subscription may determine whether to transmit a UAI with an uplink SISO request, or a UAI with an uplink MIMO request, or whether to transmit no UAI when a previous UAI is still applicable. The subscription may determine the UAI based at least in part on a quantity of Tx chains currently being used by the subscription. In this case, after the expiry of the hysteresis timer, the subscription may transmit a UAI with an uplink SISO request (event E) to the network node, even though a same type of UAI was the last UAI to be sent to the network node.

In some aspects, the hysteresis timer may be set depending on a duration of a prohibit timer. For example, a duration of the hysteresis timer may be set to X when the duration of the prohibit timer is greater than X. Otherwise, the hysteresis timer may not be used. In other words, the hysteresis timer may only be used when the duration of the prohibit timer is relatively long in relation to a defined time duration (e.g., one or two seconds). As an example, when the prohibit timer is four seconds, the hysteresis timer may be set to one or two seconds. On the other hand, if the prohibit timer is two seconds, the hysteresis timer may not be used.

As indicated above, FIG. 8 is provided as an example. Other examples may differ from what is described with regard to FIG. 8.

Figure 9:
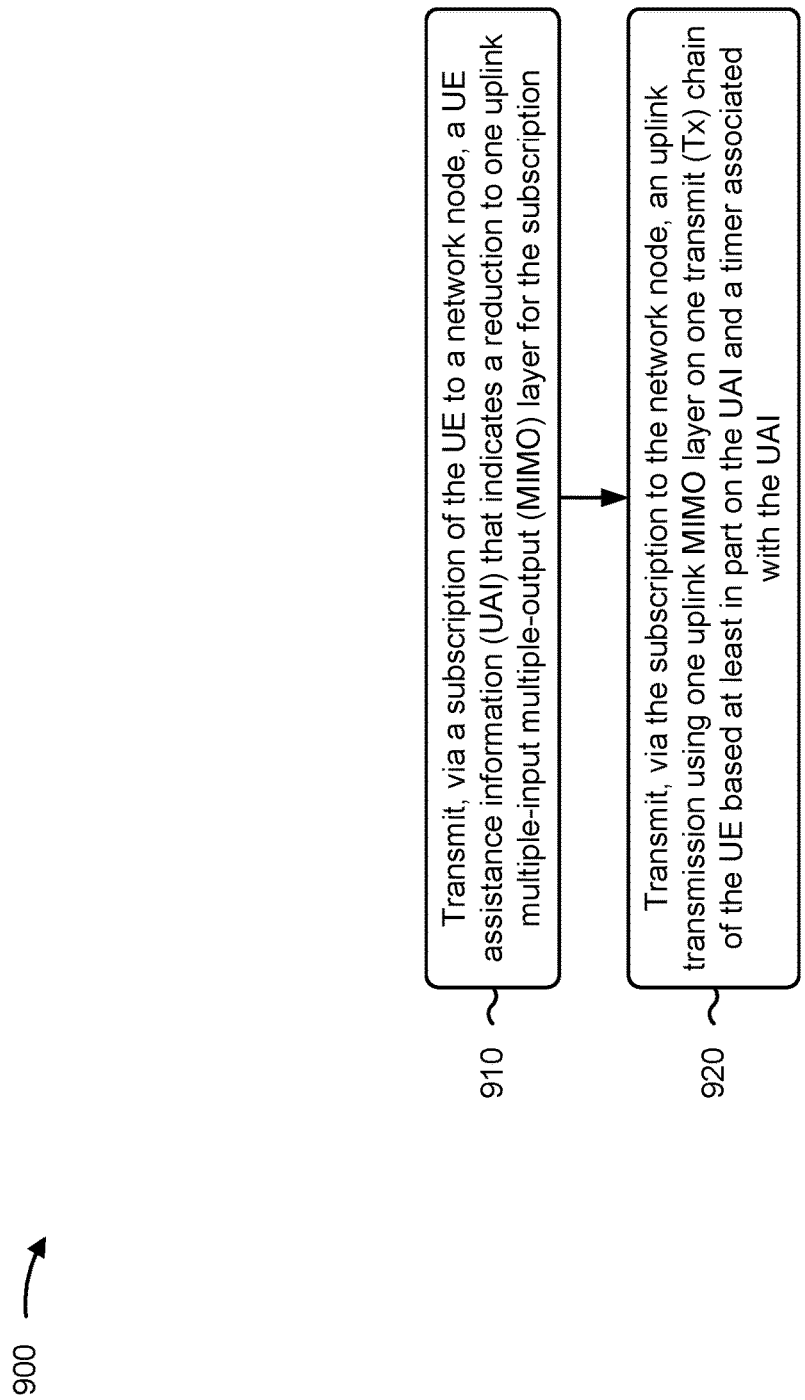
FIG. 9 is a diagram illustrating an example process associated with a UAI indicating a reduction to one Tx chain for a subscription, in accordance with the present disclosure.

FIG. 9 is a diagram illustrating an example process 900 performed, for example, by a UE, in accordance with the present disclosure. Example process 900 is an example where the UE (e.g., UE 120) performs operations associated with UAI indicating a reduction to one Tx chain for a subscription.

As shown in FIG. 9, in some aspects, process 900 may include transmitting, via a subscription of the UE to a network node, a UAI that indicates a reduction to one uplink MIMO layer for the subscription (block 910). For example, the UE (e.g., using communication manager 140 and/or transmission component 1004, depicted in FIG. 10) may transmit, via a subscription of the UE to a network node, a UAI that indicates a reduction to one uplink MIMO layer for the subscription, as described above.

As further shown in FIG. 9, in some aspects, process 900 may include transmitting, via the subscription to the network node, an uplink transmission using one uplink MIMO layer on one Tx chain of the UE based at least in part on the UAI and a timer associated with the UAI (block 920). For example, the UE (e.g., using communication manager 140 and/or transmission component 1004, depicted in FIG. 10) may transmit, via the subscription to the network node, an uplink transmission using one uplink MIMO layer on one Tx chain of the UE based at least in part on the UAI and a timer associated with the UAI, as described above.

Process 900 may include additional aspects, such as any single aspect or any combination of aspects described below and/or in connection with one or more other processes described elsewhere herein.

In a first aspect, transmitting the UAI is based at least in part on the UE exiting a mode that supports two Tx chains for the subscription at a same time and entering a mode that supports the one Tx chain for the subscription.

In a second aspect, alone or in combination with the first aspect, process 900 includes starting the timer based at least in part on the UAI that indicates the reduction to one uplink MIMO layer for the subscription, and forcing the one Tx chain for the subscription after an expiry of the timer.

In a third aspect, alone or in combination with one or more of the first and second aspects, process 900 includes receiving, from the network node and after an expiry of the timer, one of an RRC reconfiguration that reconfigures a maximum quantity of uplink MIMO layers to one or includes an indication to switch to a BWP with a maximum quantity of uplink MIMOs of one, or downlink control information that causes the switch to the BWP with the maximum quantity of uplink MIMOs of one.

In a fourth aspect, alone or in combination with one or more of the first through third aspects, process 900 includes starting the timer based at least in part on the UAI that indicates the reduction to one uplink MIMO layer for the subscription, receiving, from the network node and before an expiry of the timer, one of an RRC reconfiguration that reconfigures a maximum quantity of uplink MIMO layers to one or includes an indication to switch to a BWP with a maximum quantity of uplink MIMOs of one, or DCI that causes the switch to the BWP with the maximum quantity of uplink MIMOs of one, and forcing the one Tx chain for the subscription before the expiry of the timer based at least in part on the RRC reconfiguration or the DCI.

In a fifth aspect, alone or in combination with one or more of the first through fourth aspects, process 900 includes transmitting on a single PUSCH port irrespective of an uplink grant received from the network node having two MIMO layers.

In a sixth aspect, alone or in combination with one or more of the first through fifth aspects, process 900 includes transmitting an SRS on a single SRS port to trigger an allocation of an uplink grant with a single layer.

In a seventh aspect, alone or in combination with one or more of the first through sixth aspects, process 900 includes transmitting, via the subscription to the network node, an uplink transmission using two Tx chains of the UE prior to an expiry of the timer and based at least in part on an uplink grant received from the network node having two MIMO layers.

In an eighth aspect, alone or in combination with one or more of the first through seventh aspects, process 900 includes forcing the one Tx chain for the subscription, receiving, from the network node, one of an RRC reconfiguration that reconfigures a maximum quantity of uplink MIMO layers to one or includes an indication to switch to a BWP with a maximum quantity of uplink MIMOs of one, or DCI that causes the switch to the BWP with the maximum quantity of uplink MIMOs of one, and suppressing an RLF monitoring for an uplink during a time period between forcing the one Tx chain for the subscription and receiving the RRC reconfiguration or the DCI.

In a ninth aspect, alone or in combination with one or more of the first through eighth aspects, process 900 includes suspending an incrementing of a counter associated with a quantity of retransmissions to avoid reaching a value associated with a maximum quantity of retransmissions, and process 900 includes resuming the RLF monitoring after receiving the RRC reconfiguration or the DCI from the network node.

In a tenth aspect, alone or in combination with one or more of the first through ninth aspects, the UAI is a first UAI, and process 900 includes determining to enter a mode that supports two Tx chains for the subscription, starting a hysteresis timer based at least in part on the determination to enter the mode that supports the two Tx chains for the subscription, wherein the hysteresis timer prevents the subscription from transmitting a second UAI while the hysteresis timer is running, and process 900 includes determining whether to transmit the second UAI after an expiry of the hysteresis timer based at least in part on the first UAI.

In an eleventh aspect, alone or in combination with one or more of the first through tenth aspects, process 900 includes configuring a duration of the hysteresis timer based at least in part on a duration of a prohibit timer that prohibits consecutive UAI transmissions within a defined time period.

In a twelfth aspect, alone or in combination with one or more of the first through eleventh aspects, the subscription is associated with NR.

In a thirteenth aspect, alone or in combination with one or more of the first through twelfth aspects, the UE supports multiple subscriptions and multiple Tx chains corresponding to the multiple subscriptions.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
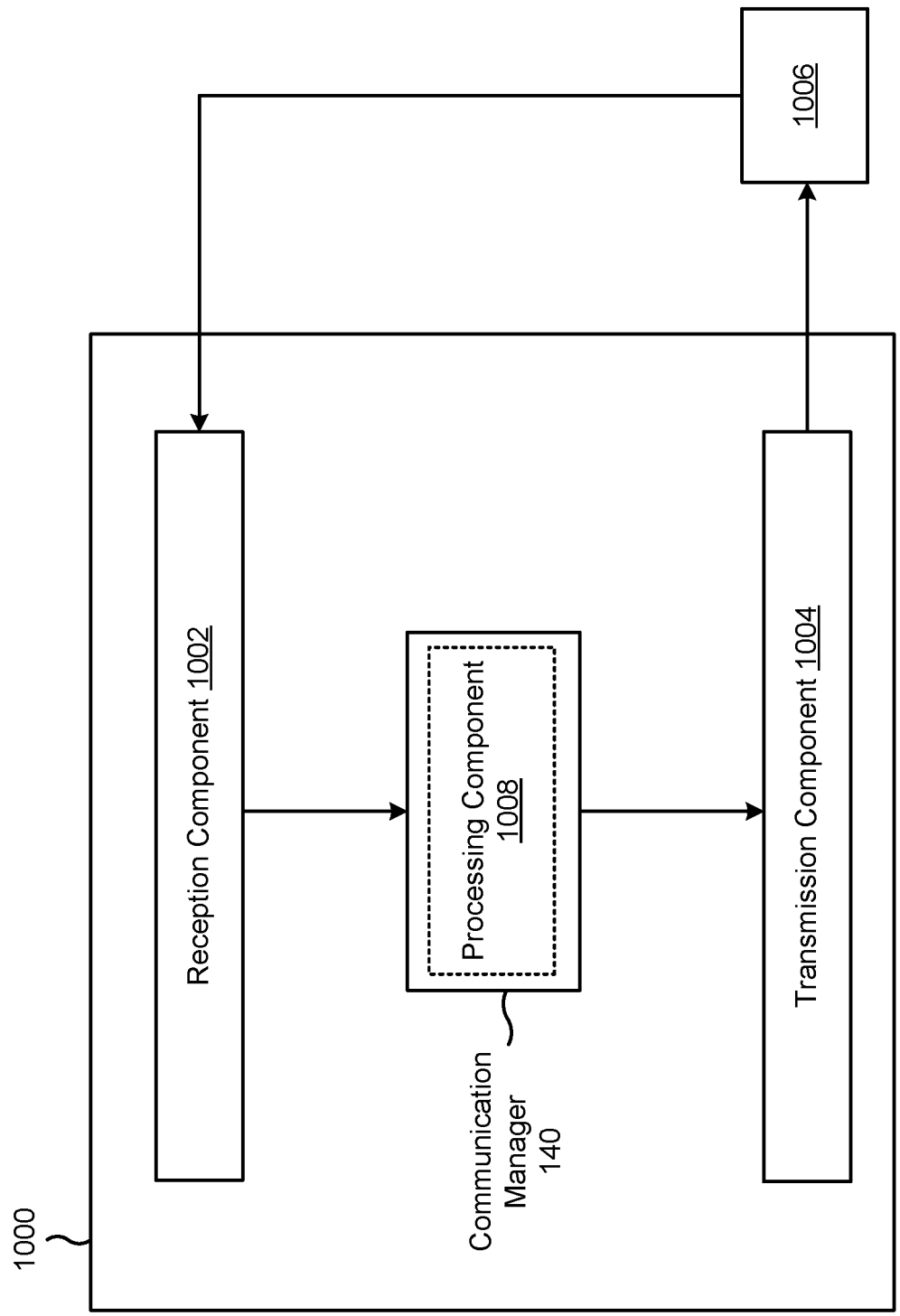
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a processing component 1008, among other examples.

In some aspects, the apparatus 1000 may be configured to perform one or more operations described herein in connection with FIGS. 3-8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit, via a subscription of the UE to a network node, a UAI that indicates a reduction to one uplink MIMO layer for the subscription. The transmission component 1004 may transmit, via the subscription to the network node, an uplink transmission using one uplink MIMO layer on one Tx chain of the UE based at least in part on the UAI and a timer associated with the UAI.

The transmission component 1004 may transmit the UAI based at least in part on the UE exiting a mode that supports two Tx chains for the subscription at a same time and entering a mode that supports the one Tx chain for the subscription. The processing component 1008 may start the timer based at least in part on the UAI that indicates the reduction to one uplink MIMO layer for the subscription. The processing component 1008 may force the one Tx chain for the subscription after an expiry of the timer.

The reception component 1002 may receive, from the network node and after an expiry of the timer, one of: an RRC reconfiguration that reconfigures a maximum quantity of uplink MIMO layers to one or includes an indication to switch to a BWP with a maximum quantity of uplink MIMOs of one, or DCI that causes the switch to the BWP with the maximum quantity of uplink MIMOs of one.

The processing component 1008 may start the timer based at least in part on the UAI that indicates the reduction to one uplink MIMO layer for the subscription. The reception component 1002 may receive, from the network node and before an expiry of the timer, one of: an RRC reconfiguration that reconfigures a maximum quantity of uplink MIMO layers to one or includes an indication to switch to a BWP with a maximum quantity of uplink MIMOs of one, or DCI that causes the switch to the BWP with the maximum quantity of uplink MIMOs of one. The processing component 1008 may force the one Tx chain for the subscription before the expiry of the timer based at least in part on the RRC reconfiguration or the DCI.

The transmission component 1004 may transmit on a single PUSCH port irrespective of an uplink grant received from the network node having two MIMO layers. The transmission component 1004 may transmit an SRS on a single SRS port to trigger an allocation of an uplink grant with a single layer. The transmission component 1004 may transmit, via the subscription to the network node, an uplink transmission using two Tx chains of the UE prior to an expiry of the timer and based at least in part on an uplink grant received from the network node having two MIMO layers.

The processing component 1008 may force the one Tx chain for the subscription. The reception component 1002 may receive, from the network node, one of: an RRC reconfiguration that reconfigures a maximum quantity of uplink MIMO layers to one or includes an indication to switch to a BWP with a maximum quantity of uplink MIMOs of one, or DCI that causes the switch to the BWP with the maximum quantity of uplink MIMOs of one. The processing component 1008 may suppress an RLF monitoring for an uplink during a time period between forcing the one Tx chain for the subscription and receiving the RRC reconfiguration or the DCI. The processing component 1008 may configure a duration of the hysteresis timer based at least in part on a duration of a prohibit timer that prohibits consecutive UAI transmissions within a defined time period.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting, via a subscription of the UE to a network node, a UE assistance information (UAI) that indicates a reduction to one uplink multiple-input multiple-output (MIMO) layer for the subscription; and transmitting, via the subscription to the network node, an uplink transmission using one uplink MIMO layer on one transmit (Tx) chain of the UE based at least in part on the UAI and a timer associated with the UAI.

Aspect 2: The method of Aspect 1, wherein transmitting the UAI is based at least in part on the UE exiting a mode that supports two Tx chains for the subscription at a same time and entering a mode that supports the one Tx chain for the subscription.

Aspect 3: The method of any of Aspects 1 through 2, further comprising: starting the timer based at least in part on the UAI that indicates the reduction to one uplink MIMO layer for the subscription; and forcing the one Tx chain for the subscription after an expiry of the timer.

Aspect 4: The method of any of Aspects 1 through 3, further comprising: receiving, from the network node and after an expiry of the timer, one of: a radio resource control reconfiguration that reconfigures a maximum quantity of uplink MIMO layers to one or includes an indication to switch to a bandwidth part (BWP) with a maximum quantity of uplink MIMOs of one, or downlink control information that causes the switch to the BWP with the maximum quantity of uplink MIMOs of one.

Aspect 5: The method of any of Aspects 1 through 4, further comprising: starting the timer based at least in part on the UAI that indicates the reduction to one uplink MIMO layer for the subscription; receiving, from the network node and before an expiry of the timer, one of: a radio resource control (RRC) reconfiguration that reconfigures a maximum quantity of uplink MIMO layers to one or includes an indication to switch to a bandwidth part (BWP) with a maximum quantity of uplink MIMOs of one, or downlink control information (DCI) that causes the switch to the BWP with the maximum quantity of uplink MIMOs of one; and forcing the one Tx chain for the subscription before the expiry of the timer based at least in part on the RRC reconfiguration or the DCI.

Aspect 6: The method of any of Aspects 1 through 5, wherein transmitting the uplink transmission using one uplink MIMO layer comprises transmitting on a single physical uplink shared channel port irrespective of an uplink grant received from the network node having two MIMO layers.

Aspect 7: The method of any of Aspects 1 through 6, wherein transmitting the uplink transmission using one uplink MIMO layer comprises transmitting a sounding reference signal (SRS) on a single SRS port to trigger an allocation of an uplink grant with a single layer.

Aspect 8: The method of any of Aspects 1 through 7, further comprising: transmitting, via the subscription to the network node, an uplink transmission using two Tx chains of the UE prior to an expiry of the timer and based at least in part on an uplink grant received from the network node having two MIMO layers.

Aspect 9: The method of any of Aspects 1 through 8, further comprising: forcing the one Tx chain for the subscription; receiving, from the network node, one of: a radio resource control (RRC) reconfiguration that reconfigures a maximum quantity of uplink MIMO layers to one or includes an indication to switch to a bandwidth part (BWP) with a maximum quantity of uplink MIMOs of one, or downlink control information (DCI) that causes the switch to the BWP with the maximum quantity of uplink MIMOs of one; and suppressing a radio link failure (RLF) monitoring for an uplink during a time period between forcing the one Tx chain for the subscription and receiving the RRC reconfiguration or the DCI.

Aspect 10: The method of Aspect 9, wherein suppressing the RLF monitoring comprises suspending an incrementing of a counter associated with a quantity of retransmissions to avoid reaching a value associated with a maximum quantity of retransmissions, and further comprising resuming the RLF monitoring after receiving the RRC reconfiguration or the DCI from the network node.

Aspect 11: The method of any of Aspects 1 through 10, wherein the UAI is a first UAI, and further comprising:

determining to enter a mode that supports two Tx chains for the subscription; starting a hysteresis timer based at least in part on the determination to enter the mode that supports the two Tx chains for the subscription, wherein the hysteresis timer prevents the subscription from transmitting a second UAI while the hysteresis timer is running; and determining whether to transmit the second UAI after an expiry of the hysteresis timer based at least in part on the first UAI.

Aspect 12: The method of Aspect 11, further comprising: configuring a duration of the hysteresis timer based at least in part on a duration of a prohibit timer that prohibits consecutive UAI transmissions within a defined time period.

Aspect 13: The method of any of Aspects 1 through 12, wherein the subscription is associated with New Radio.

Aspect 14: The method of any of Aspects 1 through 13, wherein the UE supports multiple subscriptions and multiple Tx chains corresponding to the multiple subscriptions.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      transmit, via a subscription of the UE to a network node, a UE assistance information (UAI) that indicates a reduction to one uplink multiple-input multiple-output (MIMO) layer for the subscription; and
      transmit, via the subscription to the network node, an uplink transmission using one uplink MIMO layer on one transmit (Tx) chain of the UE based at least in part on the UAI and a timer associated with the UAI.

2. The apparatus of claim 1, wherein the one or more processors are configured to transmit the UAI based at least in part on the UE exiting a mode that supports two Tx chains for the subscription at a same time and entering a mode that supports the one Tx chain for the subscription.

3. The apparatus of claim 1, wherein the one or more processors are further configured to:
   start the timer based at least in part on the UAI that indicates the reduction to one uplink MIMO layer for the subscription; and force the one Tx chain for the subscription after an expiry of the timer.

4. The apparatus of claim 1, wherein the one or more processors are further configured to:
receive, from the network node and after an expiry of the timer, one of: a radio resource control reconfiguration that reconfigures a maximum quantity of uplink MIMO layers to one or includes an indication to switch to a bandwidth part (BWP) with a maximum quantity of uplink MIMOs of one, or downlink control information that causes the switch to the BWP with the maximum quantity of uplink MIMOs of one.

5. The apparatus of claim 1, wherein the one or more processors are further configured to:
start the timer based at least in part on the UAI that indicates the reduction to one uplink MIMO layer for the subscription;
receive, from the network node and before an expiry of the timer, one of: a radio resource control (RRC) reconfiguration that reconfigures a maximum quantity of uplink MIMO layers to one or includes an indication to switch to a bandwidth part (BWP) with a maximum quantity of uplink MIMOs of one, or downlink control information (DCI) that causes the switch to the BWP with the maximum quantity of uplink MIMOs of one; and
force the one Tx chain for the subscription before the expiry of the timer based at least in part on the RRC reconfiguration or the DCI.

6. The apparatus of claim 1, wherein the one or more processors, to transmit the uplink transmission using one uplink MIMO layer, are configured to transmit on a single physical uplink shared channel port irrespective of an uplink grant received from the network node having two MIMO layers.

7. The apparatus of claim 1, wherein the one or more processors, to transmit the uplink transmission using one uplink MIMO layer, are configured to transmit a sounding reference signal (SRS) on a single SRS port to trigger an allocation of an uplink grant with a single layer.

8. The apparatus of claim 1, wherein the one or more processors are further configured to:
transmit, via the subscription to the network node, an uplink transmission using two Tx chains of the UE prior to an expiry of the timer and based at least in part on an uplink grant received from the network node having two MIMO layers.

9. The apparatus of claim 1, wherein the one or more processors are further configured to:
force the one Tx chain for the subscription;
receive, from the network node, one of: a radio resource control (RRC) reconfiguration that reconfigures a maximum quantity of uplink MIMO layers to one or includes an indication to switch to a bandwidth part (BWP) with a maximum quantity of uplink MIMOs of one, or downlink control information (DCI) that causes the switch to the BWP with the maximum quantity of uplink MIMOs of one; and
suppress a radio link failure (RLF) monitoring for an uplink during a time period between forcing the one Tx chain for the subscription and receiving the RRC reconfiguration or the DCI.

10. The apparatus of claim 9, wherein the one or more processors, to suppress the RLF monitoring, are configured to suspend an incrementing of a counter associated with a quantity of retransmissions to avoid reaching a value associated with a maximum quantity of retransmissions, and further comprising resuming the RLF monitoring after receiving the RRC reconfiguration or the DCI from the network node.

11. The apparatus of claim 1, wherein the UAI is a first UAI, and wherein the one or more processors are further configured to:
determine to enter a mode that supports two Tx chains for the subscription;
start a hysteresis timer based at least in part on the determination to enter the mode that supports the two Tx chains for the subscription, wherein the hysteresis timer prevents the subscription from transmitting a second UAI while the hysteresis timer is running; and
determine whether to transmit the second UAI after an expiry of the hysteresis timer based at least in part on the first UAI.

12. The apparatus of claim 11, wherein the one or more processors are further configured to:
configure a duration of the hysteresis timer based at least in part on a duration of a prohibit timer that prohibits consecutive UAI transmissions within a defined time period.

13. The apparatus of claim 1, wherein the subscription is associated with New Radio.

14. The apparatus of claim 1, wherein the UE supports multiple subscriptions and multiple Tx chains corresponding to the multiple subscriptions.

15. A method of wireless communication performed by a user equipment (UE), comprising:
transmitting, via a subscription of the UE to a network node, a UE assistance information (UAI) that indicates a reduction to one uplink multiple-input multiple-output (MIMO) layer for the subscription; and
transmitting, via the subscription to the network node, an uplink transmission using one uplink MIMO layer on one transmit (Tx) chain of the UE based at least in part on the UAI and a timer associated with the UAI.

16. The method of claim 15, wherein transmitting the UAI is based at least in part on the UE exiting a mode that supports two Tx chains for the subscription at a same time and entering a mode that supports the one Tx chain for the subscription.

17. The method of claim 15, further comprising:
starting the timer based at least in part on the UAI that indicates the reduction to one uplink MIMO layer for the subscription; and
forcing the one Tx chain for the subscription after an expiry of the timer.

18. The method of claim 15, further comprising:
receiving, from the network node and after an expiry of the timer, one of: a radio resource control reconfiguration that reconfigures a maximum quantity of uplink MIMO layers to one or includes an indication to switch to a bandwidth part (BWP) with a maximum quantity of uplink MIMOs of one, or downlink control information that causes the switch to the BWP with the maximum quantity of uplink MIMOs of one.

19. The method of claim 15, further comprising:
starting the timer based at least in part on the UAI that indicates the reduction to one uplink MIMO layer for the subscription;
receiving, from the network node and before an expiry of the timer, one of: a radio resource control (RRC) reconfiguration that reconfigures a maximum quantity of uplink MIMO layers to one or includes an indication to switch to a bandwidth part (BWP) with a maximum quantity of uplink MIMOs of one, or downlink control information (DCI) that causes the switch to the BWP with the maximum quantity of uplink MIMOs of one; and forcing the one Tx chain for the subscription before the expiry of the timer based at least in part on the RRC reconfiguration or the DCI.

20. The method of claim 15, wherein transmitting the uplink transmission using one uplink MIMO layer comprises transmitting on a single physical uplink shared channel port irrespective of an uplink grant received from the network node having two MIMO layers.

21. The method of claim 15, wherein transmitting the uplink transmission using one uplink MIMO layer comprises transmitting a sounding reference signal (SRS) on a single SRS port to trigger an allocation of an uplink grant with a single layer.

22. The method of claim 15, further comprising:
transmitting, via the subscription to the network node, an uplink transmission using two Tx chains of the UE prior to an expiry of the timer and based at least in part on an uplink grant received from the network node having two MIMO layers.

23. The method of claim 15, further comprising:
forcing the one Tx chain for the subscription;
receiving, from the network node, one of: a radio resource control (RRC) reconfiguration that reconfigures a maximum quantity of uplink MIMO layers to one or includes an indication to switch to a bandwidth part (BWP) with a maximum quantity of uplink MIMOs of one, or downlink control information (DCI) that causes the switch to the BWP with the maximum quantity of uplink MIMOs of one; and
suppressing a radio link failure (RLF) monitoring for an uplink during a time period between forcing the one Tx chain for the subscription and receiving the RRC reconfiguration or the DCI.

24. The method of claim 23, wherein suppressing the RLF monitoring comprises suspending an incrementing of a counter associated with a quantity of retransmissions to avoid reaching a value associated with a maximum quantity of retransmissions, and further comprising resuming the RLF monitoring after receiving the RRC reconfiguration or the DCI from the network node.

25. The method of claim 15, wherein the UAI is a first UAI, and further comprising:
determining to enter a mode that supports two Tx chains for the subscription;
starting a hysteresis timer based at least in part on the determination to enter the mode that supports the two Tx chains for the subscription, wherein the hysteresis timer prevents the subscription from transmitting a second UAI while the hysteresis timer is running; and
determining whether to transmit the second UAI after an expiry of the hysteresis timer based at least in part on the first UAI.

26. The method of claim 25, further comprising:
configuring a duration of the hysteresis timer based at least in part on a duration of a prohibit timer that prohibits consecutive UAI transmissions within a defined time period.

27. The method of claim 15, wherein the subscription is associated with New Radio.

28. The method of claim 15, wherein the UE supports multiple subscriptions and multiple Tx chains corresponding to the multiple subscriptions.

29. A non-transitory computer-readable medium storing a set of instructions for wireless communication, the set of instructions comprising:
one or more instructions that, when executed by one or more processors of a user equipment (UE), cause the UE to:
transmit, via a subscription of the UE to a network node, a UE assistance information (UAI) that indicates a reduction to one uplink multiple-input multiple-output (MIMO) layer for the subscription; and
transmit, via the subscription to the network node, an uplink transmission using one uplink MIMO layer on one transmit chain of the UE based at least in part on the UAI and a timer associated with the UAI.

30. An apparatus for wireless communication, comprising:
means for transmitting, via a subscription of the apparatus to a network node, assistance information that indicates a reduction to one uplink multiple-input multiple-output (MIMO) layer for the subscription; and
means for transmitting, via the subscription to the network node, an uplink transmission using one uplink MIMO layer on one transmit chain of the apparatus based at least in part on the assistance information and a timer associated with the assistance information.

* * * * *